United States Patent [19]

Tsujino et al.

[11] Patent Number: 5,397,393
[45] Date of Patent: Mar. 14, 1995

[54] PAN COATING APPARATUS

[75] Inventors: Takuichi Tsujino; Syuri Yamada; Masanori Ogawa; Narimichi Takei, all of Tokyo, Japan

[73] Assignee: Freund Industrial Co., Ltd., Tokyo, Japan

[21] Appl. No.: 90,793

[22] Filed: Jul. 12, 1993

[30] Foreign Application Priority Data

Jul. 10, 1992 [JP]  Japan .................................. 4-183723

[51] Int. Cl.[6] .............................................. A23G 3/20
[52] U.S. Cl. ........................................ 118/19; 118/20; 118/24; 118/64; 118/303; 34/607
[58] Field of Search ................ 118/19, 20, 24, 31, 118/50, 64, 303, 326, 417, 418; 34/133 J, 133 M, 133 P, 133 Q

[56] References Cited

U.S. PATENT DOCUMENTS

| | | | |
|---|---|---|---|
| 3,285,223 | 11/1966 | Sahlin | 118/418 |
| 3,302,608 | 2/1967 | Coons et al. | 118/20 |
| 3,494,327 | 2/1970 | Pearson | 118/418 |
| 3,841,262 | 10/1974 | Groppenbacher et al. | 118/24 |
| 3,874,092 | 4/1975 | Huttlin | 118/19 |
| 4,444,810 | 4/1984 | Huttlin | 118/19 |
| 4,463,703 | 8/1984 | Huttlin | 118/24 |
| 4,499,847 | 2/1985 | Dunaitschik | 118/19 |
| 4,649,855 | 3/1987 | Preis | 118/19 |

FOREIGN PATENT DOCUMENTS

| | | |
|---|---|---|
| 50-38713 | 12/1975 | Japan . |
| 60-500894 | 6/1985 | Japan . |
| 2207833 | 8/1990 | Japan . |

*Primary Examiner*—James C. Housel
*Assistant Examiner*—Jan M. Ludlow
*Attorney, Agent, or Firm*—Kane, Dalsimer, Sullivan, Kurucz, Levy, Eisele and Richard

[57] ABSTRACT

A pan coating apparatus wherein a blow-out portion is provided at the forward end of an air supply pipe inserted into a rotatable container, and the total opening area of gas outlets provided in the blow-out portion is set at 0.1–1 time that of perforations provided in a perforated plate of the rotatable container.

12 Claims, 7 Drawing Sheets

PAN COATING APPARATUS

BACKGROUND OF THE INVENTION

1. Field of the Invention

This invention relates to a pan coating apparatus, and more particularly to improvements in a pan coating apparatus for coating particles such as tablets and granules of pharmaceuticals, foods, and the like.

2. Description of the Prior Art

As an apparatus for coating particles such as tablets and granules, at present, generally an apparatus disclosed in Japanese Patent Publication No. 50-38713 and improved apparatuses based on 50-38713 have been used.

All of these conventional apparatuses are constructed such that a rotatable container (coating pan), in which at least a part of side walls is formed of a perforated plate, is rotated about a horizontal axis; coating solution is sprayed from a spraying device; air is introduced into the coating pan for drying coating solution applied to the surfaces of particles; and air is exhausted from an inside space of the coating pan, passing through an accumulated particle layer, the perforated plate and an air duct formed to cover the perforated plate portion of the coating pan.

The most important differences among the apparatus disclosed in 50-38713 and its improved version reside in methods of introducing air.

Figure 11:
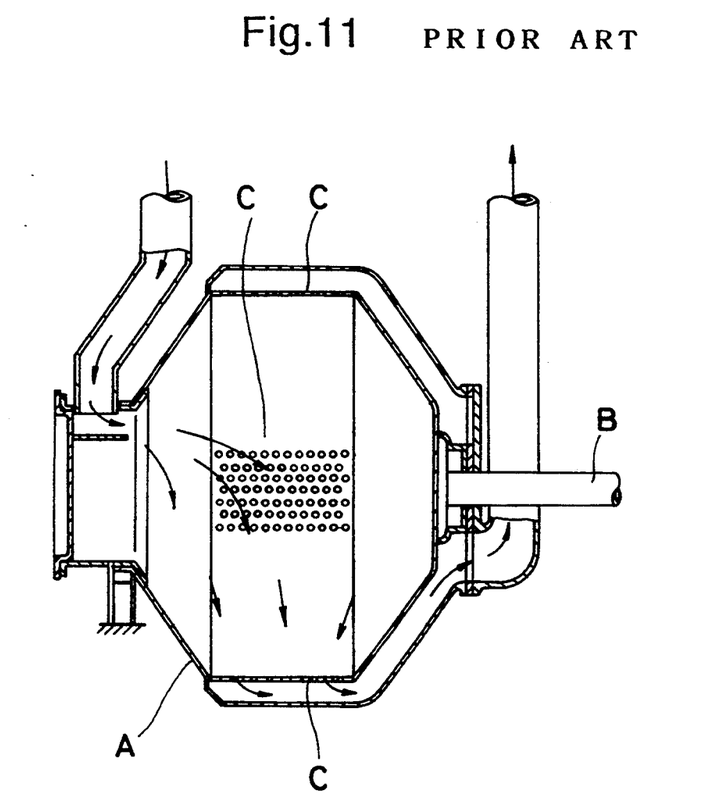

As shown in FIG. 11, in the apparatus of 50-38713 as being a prototype, an opening is provided in a container on the side surface vertical to an axis B of rotation of the coating pan A, and particles are charged through an inlet opening of a fixed cylinder provided in a manner that the periphery of the opening of the container is slidable on this cylinder. The introduction of air is performed through an air supply duct provided on the side surface of the fixed cylinder, and the air is exhausted through perforations C provided in the peripheral surface of the container.

Figure 12:
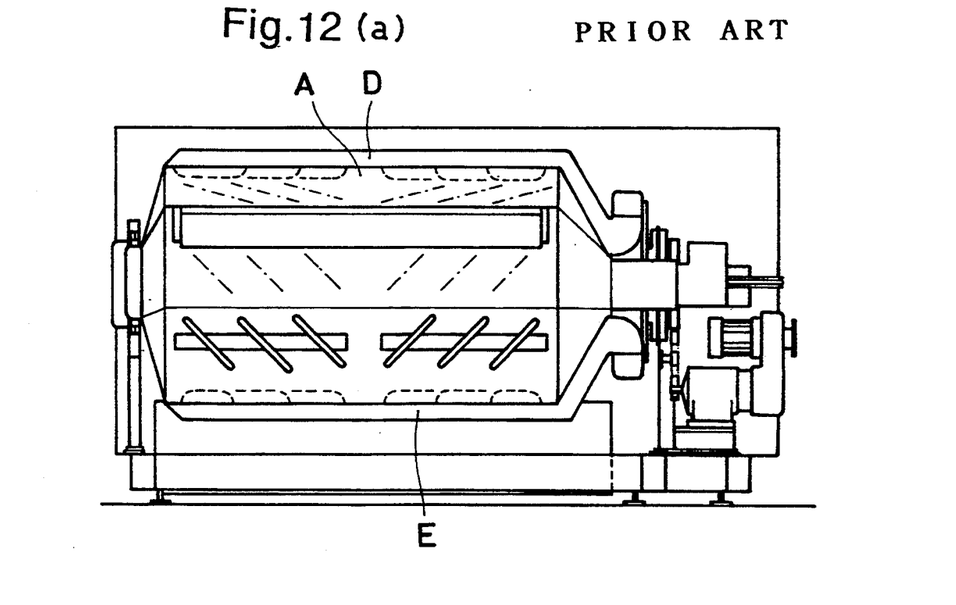

An apparatus described in Japanese Unexamined Patent Application Laid-Open No. 60-500894 (Refer to FIG. 12(a)) is similar in type to the above-described apparatus except that out of perforated plates provided on the side surface of a container, air is introduced through a perforated plate D positioned at the top and substantially opposed to an accumulated particle layer, and exhausted through a perforated plate E positioned at the bottom, being in contact with the bottom portion of the accumulated particle layer. An air distributor F (Refer to FIG. 12(b)) is provided for this purpose.

An apparatus described in Japanese Unexamined Patent Application Laid-Open No. 2-207833 (Refer to FIG. 13) is of such an arrangement that an air pipe G is provided to project into a coating pan A in a manner that the base portion of the pipe is slidable with the vertical surface of the container; air is blown out of a cut-away portion of the air pipe G into the coating pan A; and the direction of blow-out is variable.

Furthermore, in these conventional apparatuses, direction of the air flow may be reversed in such a way that air is introduced from a perforated plate of the coating pan, which is positioned in contact with the bottom portion of the accumulated particle layer, and the air is exhausted through the above-described various air introducing paths.

However, in the conventional apparatuses using the above-described various air introducing methods, there are following disadvantages, respectively.

Firstly, in the apparatus described in 50-38713, air flows from the front of the coating pan (in the left in FIG. 11) to the rear and downward, and particularly, when an air supply pipe is narrow at a portion where air is introduced through the opening of the coating pan, the flow velocity of the introduced air is high, whereby sprayed liquid drops are caused to drift and a spray pattern is disturbed, and a coating layer on a particle tends to be non-uniform.

If the cross-sectional area of the introducing portion is increased, then the flow velocity becomes lower and the disturbance of the spray pattern becomes small. In that case, however, air flow passes mainly through the front portion of the pan while poorly passing through the accumulated particle layer in the rear portion of the pan, so that the drying efficiency is decreased.

In the apparatus described in 60-500894, air is introduced through the perforated plate D positioned at the top of the pan, the air flows slowly from above to below over the whole area in the pan and there is such an advantage that the spray pattern is not disturbed. However, when a duct is positioned at the top, the duct is used for introducing air, and, when the same duct is positioned at the bottom, the duct is used for exhausting air, whereby dried particles of spray mist and dust produced due to abrasion of the particles enter the duct at the time of exhausting air, and, when this duct is turned to the top, the dust is blown back into the pan, so that the dust adheres to the surfaces of the particles, thus leading to rough coating surfaces.

Furthermore, when one and the same coating pan is used for coating particles of different kinds, the particles which have been coated in the former batch and dust produced from the dried coating solution remain in the ducts and adhere to the particles, so that fatal disadvantages are presented from the view point of good manufacturing practice (GMP) when, for example, the particles to be processed are pharmaceuticals.

Figure 13:
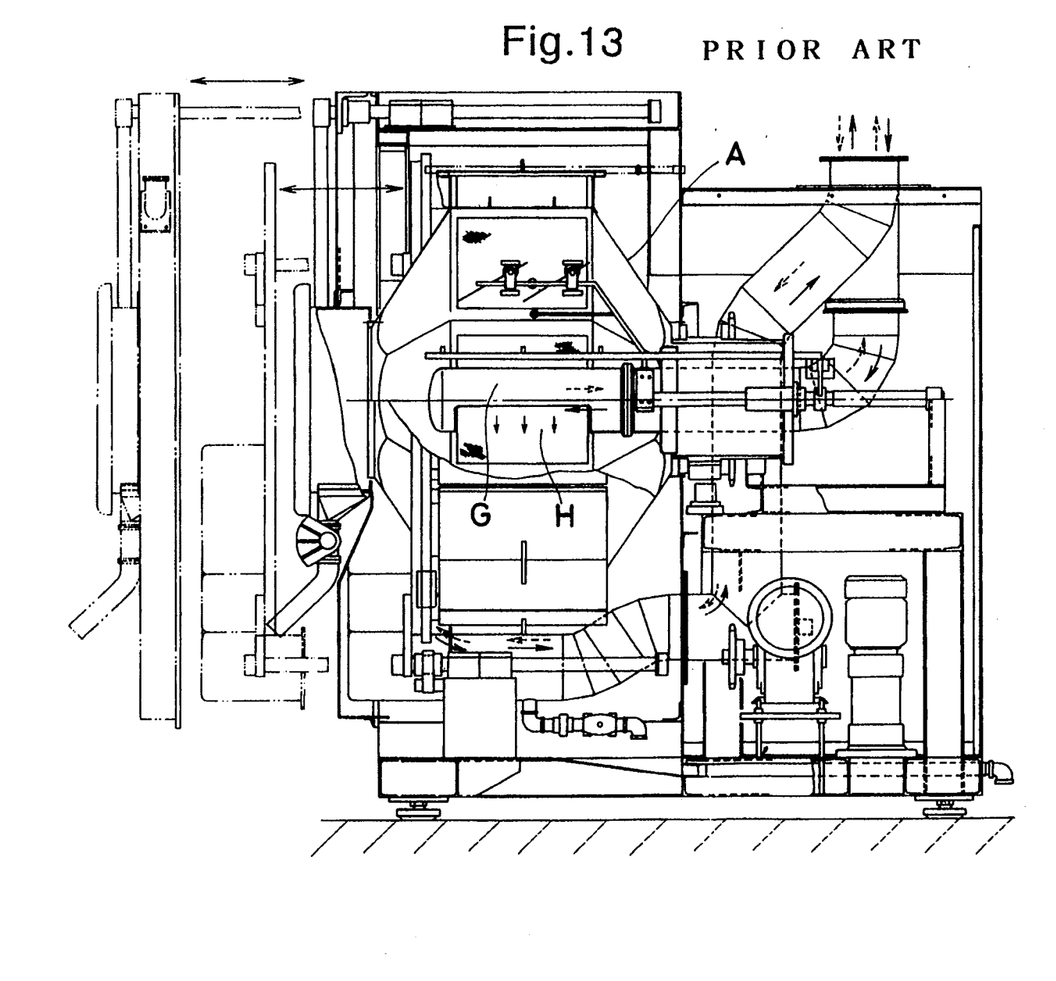

In the apparatus described in 2-207833, although there are differences depending on the position of an air pipe G projected into the pan, the size of a cutaway portion H for blowing out air, the direction of blow-out and so forth, the air flow velocity is high at the portion where air is blown out, so that the spray pattern becomes disturbed.

Furthermore, the air flow velocity of the air stream is fairly high within the air pipe, whereby, even if the blow-out opening is directed downward, air is blown to the front side of the pan (left in FIG. 13), so that coating solution tends to adhere to the inner wall of the pan and there may occur a dusting phenomenon in which the liquid drops of the coating solution is dried to become fine powder before the liquid drops adhere the particles.

Although this diadvantage may be lessened by increasing the diameter of the air pipe, the diameter of the air pipe cannot be increased to the extent where this disadvantages can be completely obviated, because of the construction of the pan.

In all of the above-described apparatus, introduction of air becomes same when the air flow is reversed. In this case, air flow becomes reverse to the blow-out direction of the spray solution, so that the spray pattern is disturbed extremely and the above-described dusting tends to occur.

Thus, there are disadvantages in all of the conventional methods of introducing air into the apparatuses, and no satisfactory method has been found.

It is an object of the present invention to provide a pan coating apparatus having a gas blow-out portion capable of forming and maintaining the satisfactory spray pattern.

SUMMARY OF THE INVENTION

In a pan coating apparatus according to the present invention, a blow-out portion of an air-supply pipe comprises one or more opening portions each having a multitude of gas outlets (blow-out openings) distributed over the whole area, and the total opening area is set at 0.1–1 time the whole opening area of perforated plates of a rotatable container.

According to the present invention, "gas outlet" refers to a hole through which the gas flows from the air supply pipe into the pan, such for example as a circular or rectangular hole formed in a perforated plate, fine hole of indefinite shapes formed in a sintered material.

Furthermore, "blow-out portion" refers to a portion disposed at the distal end of the air supply pipe and having gas outlets. When the gas outlet is single or small in number as in the section of the air supply pipe, the blow-out portion refers to gas outlet itself or gas outlets themselves. When there are a multitude of gas outlets as in the perforated plate, the gas blow-out portion refers to the whole perforated plate.

In the latter, all of the gas outlets may not be distributed all over the blow-out portion and may be divided into a few opening portions. As to the latter case, the present inventors have clarified that the total opening area of these opening portions is highly related to the distribution and flow velocity of the gas flow in the pan.

According to the present invention, the apparatus is provided with a multitude of gas outlets, and it is required that the ratio of the opening area of the blow-out portion to the opening area of the perforated plate lies in the range between 0.1:1 and 1:1.

Due to the multitude of gas outlets, the cross-sectional area of the gas flow is increased, so that the gas slowly flows into the pan. When the ratio between the above-described areas is less than 0.1, the flow velocity of the gas from the blow-out portion is increased and the spray pattern becomes disturbed. When the ratio is more than 1, no better result is obtained thereby, and, on the contrary, the blow-out portion becomes too large in size, making it difficult to set it inside the coating pan, and the space inside the pan becomes unfavorably small.

Incidentally, in the conventional apparatus described in the above 2-207833, the above ratio between the opening areas is less than 0.05, whereby there is a great difference from the apparatus of the present invention, causing disturbance of the spray pattern.

According to the present invention, a part of the blow-out portion may be constructed to be detachable so that the opening area of the gas outlets of the blow-out portion can be adjusted in accordance with the type of particles to be coated.

In the apparatus of the present invention, the air supply pipe is also projected into the rotatable container from the side surface of the rotatable container, which is vertical to the axis of rotation, normally from the rear side (the side opposite to a control side) of the pan. To realize the present invention, the blow-out portion having a large area may be connected to the forward end of the air supply pipe. The shape of the blow-out portion, the shape and distribution of the blow-out openings and the like are not particularly restricted. However, it is favorable that the gas is blown out uniformly as much as possible.

Furthermore, in order to make the air stream uniform, the blow-out portion is preferably provided at a position above the axis of rotation of the rotatable container.

BRIEF DESCRIPTION OF THE DRAWINGS

FIG. 1 is a schematic cross section showing an embodiment 1 of the pan coating apparatus according to the present invention;

FIG. 2 is a schematic side view thereof;

FIG. 3 is a perspective view showing an example of the blow-out portion of the air supply pipe thereof;

FIG. 4 is a perspective view showing another example of the blow-out portion;

FIG. 5 is a perspective view showing another example of the blow-out portion;

FIGS. 6–10 are views showing examples of the gas outlets;

FIG. 11 is a cross section showing the conventional pan coating apparatus as a prototype of the present invention;

FIG. 12(*a*) and 12(*b*) are a front view and a side view showing another conventional pan coating apparatus as a prototype of the present invention; and FIG. 13 is a front view showing another conventional pan coating apparatus as a prototype of the present invention.

DETAILED DESCRIPTION OF THE PREFERRED EMBODIMENTS

Referring now to the drawings, a pan coating apparatus shown in FIG. 1 is provided with a coating pan, i.e. a rotatable container I having an axis of rotation 2 extending in the substantially horizontal direction. At least at a part of the peripheral surface of the rotatable container, i.e. eight portions in this embodiment, there are provided perforated plates 4 each formed with perforations 3 as being a multitude of gas outlets.

Furthermore, each portion where the perforation 3 is provided on the perforated plate 4 is covered by an air duet 5 on the side of the outer periphery. The air duets 5 are communicated with a source of air supply or an air exhaust means.

Further, an air supply pipe 6 and a spray nozzle 7 as a device for spraying coating solution are inserted through one end (right end in FIG. 1) of the rotatable container 1 into the rotatable container 1.

The air supply pipe 6 is used for supplying hot or cold air into the rotatable container 1, the forward end portion thereof is bent into a generally L-shape so that the forwardmost end thereof is provided with a blow-out portion 8 at a position above the axis of rotation 2 of the rotatable container 1.

In the example shown in FIG. 3, the blow-out portion 8 has a shape of a roof or an inverted V-letter, and may be constructed as detachable portions so that it can be disassembled into three parts, i.e., a center portion and two side portions. In this blow-out portion 8, a multitude of gas outlets 9 are opened all over the front and rear surfaces, i.e., bottom and top surfaces of the blow-out portion 8.

The total opening area formed by these gas outlets 9 is set at 0.1–1 time the opening area of the perforations 3 provided in the perforated plate 4 of the rotatable container 1.

The ratio between the opening areas as described above can be suitably selected in accordance with the various conditions of processing, as far as it remains within the above-described range, 0.1 to 1.

Operation of this embodiment will now be described.

That is, tablets or a granular material is charged into the rotatable container 1. Air is blown out into the rotatable container 1 from the blow-out portion 8 of the air supply pipe 6, while the air in the rotatable container 1 is exhausted through the air duct 5. The rotatable container 1 is rotated about the axis of rotation 2 with the coating solution being sprayed from the spray nozzle 7, so that the tablets or the granular material in the rotatable container 1 is coated.

The total opening area of the gas outlets 9 of the blow-out portion 8 is set at 0.1–1 time the opening area of the perforations 3 of the perforated plate 4 of the rotatable container 1, so that the spray pattern of the coating solution sprayed from the spray nozzle 7 into the rotatable container 1 can be prevented from being disturbed, and the highly satisfactory coated products can be obtained.

Particularly, in this embodiment, the gas outlets 9 are provided in the totally six opening portions in the both top and bottom surfaces of the blow-out portion 8. Air stream from the gas outlets 9 on the top surface becomes slower in its velocity because of its longer flow course than one from the gas outlets 9 on the bottom surface and is mixed with the latter to produce a uniform air flow, and therefore spray pattern is not disturbed.

Furthermore, the blow-out portion 8 is provided at the position above the axis of rotation 2 of the rotatable container 1, whereby the air stream from the gas outlets 9 becomes uniform and the satisfactory spray pattern free from the disturbance can be obtained.

Figure 3:
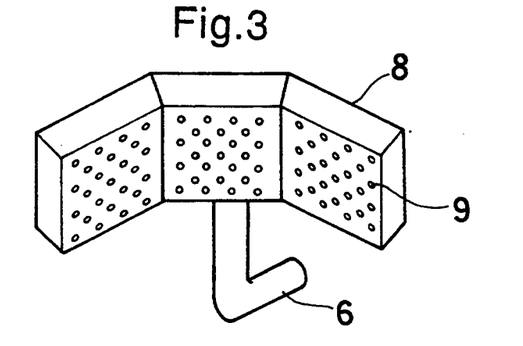
Figure 4:
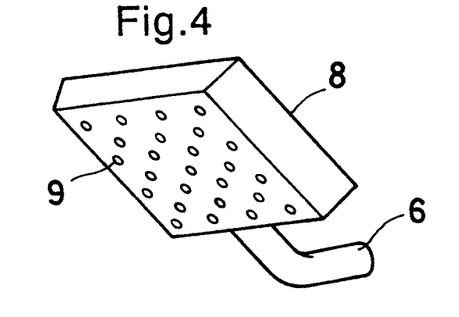
Figure 5:
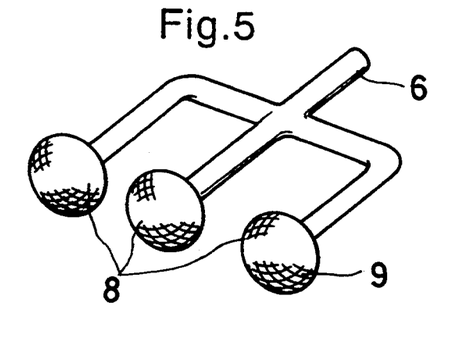

As a blow-out portion 8 of the air supply pipe 6, various constructions such as shown in FIGS. 4 and 5 can be adopted in addition to the embodiment shown in FIG. 3.

In the embodiment shown in FIG. 4, the blow-out portion 8 is formed to provide a flat shape.

In the embodiment shown in FIG. 5, the blow-out portion 8 is formed into three spherical or so-called microphone-shaped meshes or porous sintered material.

In either one of the embodiments shown in FIG. 4 and FIG. 5, the total opening area of the gas outlets 9 is 0.1–1 time the opening area of the perforations 3 of the perforated plate 4 provided in the rotatable container 1, so that satisfactory spray pattern is formed from the spray nozzle 7 without disturbance.

Furthermore, the shapes and arrangement of the gas outlets 9 should not be limited to those described in the above embodiments, and other various embodiments can be adopted as shown in FIGS. 6 to 10 for example.

Figure 1:
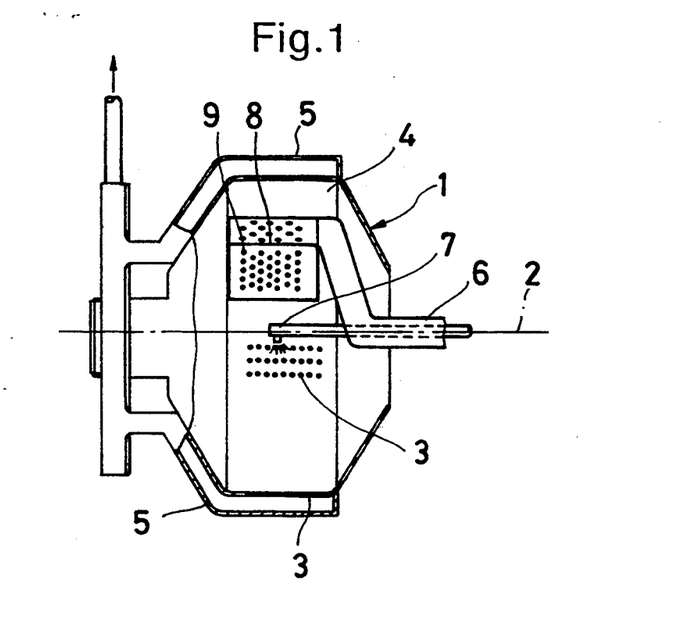
Figure 2:
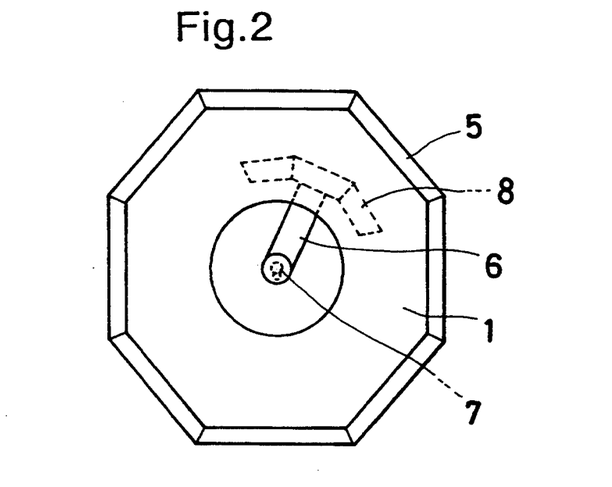
Figure 6:
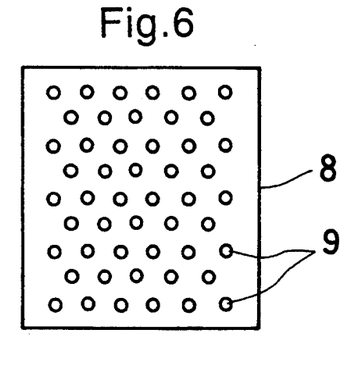

In the example shown in FIG. 6, a shape of the gas outlet 9 is a round hole similar to those in FIGS. 1, 3 and 4. These round holes may be provided only on the bottom surface (front surface) or the top surface (rear surface).

Figure 7:
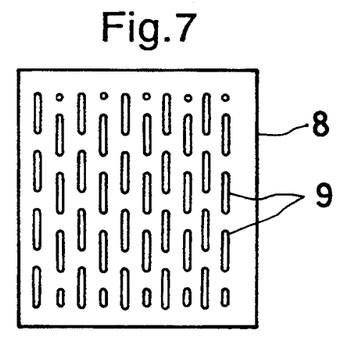

In the example shown in FIG. 7, the gas outlet 9 is of a slot shape.

Figure 8:
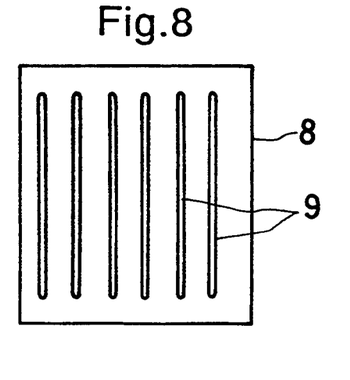

In the example shown in FIG. 8, the gas outlet 9 is of a long slot shape having the length of substantially whole surface.

Figure 9:
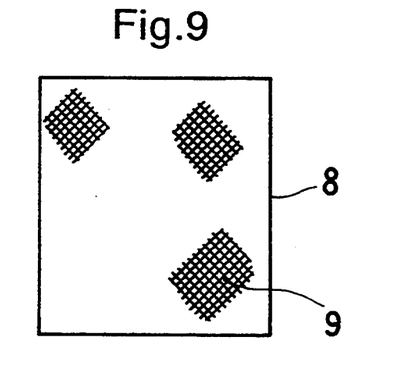

In the example shown in FIG. 9, the gas outlets 9 are formed of meshes made of metal or plastics, or porous sintered material.

Figure 10:
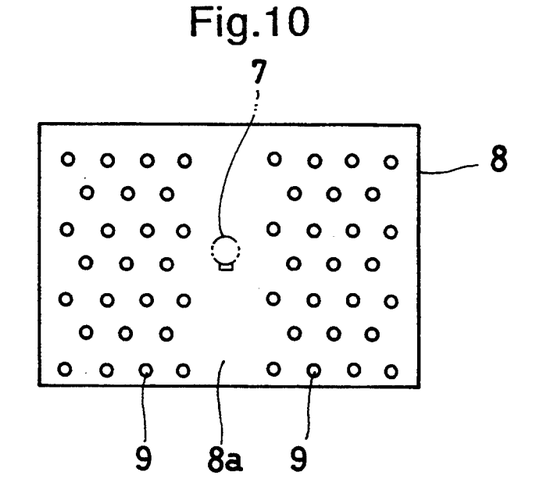

Furthermore, in the example shown in FIG. 10, such a construction is adopted that a non-porous portion 8a is provided in the center of a blow-out portion and opening portions each consisting of a multitude of gas outlets 9 are arranged at both sides of the non-porous portion respectively.

In the construction of FIG. 10, if the spray nozzle 7 is provided in the direction normal to the surface of the non-porous portion 8a in the center, then such an advantage can be obtained that the gas blown out of the gas outlets 9 disposed at the two side areas does not directly come into contact with the sprayed solution, so that the satisfactory spray pattern free from the disturbance can be obtained more reliably.

Incidentally, the present invention should not be limited to the above-described embodiments, and other various modifications can be adopted.

When the gas outlets 9 are divided into a plurality of opening portions as in FIGS. 1, 3 and 10 for example, rates and/or timings of gas blown-out can be individually controlled for each opening portion, so that the respective rates and/or timings can be made different from one another.

The effects attained by the typical inventions disclosed herein are briefly described in the following.

(1) The total opening area of the gas outlets in the blow-out portion of the air supply pipe is set at 0.1–1 time the opening area of the perforated plate provided in the rotatable container, so that the flow rate of the gas blown out of the gas outlets can be maintained suitable, and the satisfactory spray pattern free from the disturbance and the high quality coated products can be obtained.

(2) A part of the blow-out portion can be made detachable, so that the rate of blow-out and the like can be variably adjusted.

(3) The gas outlets may be divided into a plurality of opening portions and the respective opening portions may be individually controlled, so that the rates and timings of gas blown-out can be made different from each other for respective opening portions, and the desirable blow-out control can be performed.

(4) The gas outlets are provided on the bottom and top surfaces (the front and rear surfaces) of the blow-out portion, so that, particularly, the slow air stream can be obtained from the top surface (the rear surface), and the spray pattern can be formed and maintained more satisfactorily.

(5) The gas outlets are provided in the areas disposed at the both sides of the non-porous portion and the spraying device is disposed in the non-porous portion in the direction normal to the surface thereof, whereby the gas blown out of the gas outlets does not come in contact with the sprayed solution from the spraying device, so that the satisfactory spray pattern free from disturbance can be obtained more reliably.

(6) The blow-out portion is provided at the position above the axis of rotation of the rotatable container, whereby the air stream blown out of the gas outlets becomes uniform and the satisfactory spray pattern free from the disturbance can be obtained.

What is claimed is:

1. A pan coating apparatus comprising:
   a rotatable container having a substantially horizontal axis of rotation, at least a part of the rotatable container being formed of a perforated plate which is covered by an air removal duct;

an air supply pipe extending into said rotatable container; and a spraying device extending into said rotatable container for introducing coating solution therein; wherein said air supply pipe has a blow out portion within said rotatable container comprising at least one opening portion area having a multitude of gas outlet openings therein which are distributed over the whole surface area of the opening portion, and the total area of the gas outlet openings portion is 0.1–1 times the total opening area of the perforated plate of the rotatable container.

2. The pan coating apparatus as set forth in claim 1, wherein said blow-out portion is provided at a position above the axis of rotation of the rotatable container.

3. The pan coating apparatus as set forth in claim 1, wherein a part of said blow-out portion is detachable.

4. The pan coating apparatus as set forth in claim 1, wherein said gas outlet openings are provided on top and bottom surfaces of the blow-out portion.

5. The pan coating apparatus as set forth in claim 1, wherein said blow-out portion is formed to provide an inverted V-letter shape.

6. The pan coating apparatus as set forth in claim 1, wherein said blow-out portion is formed to provide a flat shape.

7. The pan coating apparatus as set forth in claim 1, wherein said blow-out portion is formed to provide a substantially spherical shape.

8. The pan coating apparatus as set forth in claim 1, wherein said gas outlet openings are formed of porous structure made of metal or plastic mesh.

9. The pan coating apparatus as set forth in claim 1, wherein said gas outlet openings are formed of porous structure made of sintered material.

10. The pan coating apparatus as set forth in claim 1, wherein said blow-out portion is constructed such that a non-porous portion is provided in a center thereof and the opening portions are arranged at both sides thereof respectively.

11. The pan coating apparatus as set forth in claim 10, wherein said spraying device includes a spray nozzle provided in said non-porous portion.

12. The pan coating apparatus as set forth in claim 1, wherein said blow-out portion is divided into a plurality of said opening portions and further including control means for controlling rates and/or timings of gas blown-out individually for respective opening portions.

* * * * *